(12) United States Patent
Kwon (10) Patent No.: US 10,717,347 B2
(45) Date of Patent: Jul. 21, 2020

(54) AIR-CONDITIONING SYSTEM FOR VEHICLE

(71) Applicants: Hyundai Motor Company, Seoul (KR); Kia Motors Corporation, Seoul (KR)

(72) Inventor: Dong Ho Kwon, Gyeongsangbuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 235 days.

(21) Appl. No.: 15/901,227

(22) Filed: Feb. 21, 2018

(65) Prior Publication Data

US 2019/0135086 A1 May 9, 2019

(30) Foreign Application Priority Data

Nov. 6, 2017 (KR) .......................... 10-2017-0146760

(51) Int. Cl.
*B60H 3/06* (2006.01)
*B60H 1/00* (2006.01)
(Continued)

(52) U.S. Cl.
CPC .......... *B60H 3/0633* (2013.01); *B60H 1/008* (2013.01); *B60H 1/00042* (2013.01);
(Continued)

(58) Field of Classification Search
CPC .................................................. B60H 1/008; B60H 1/00042; B60H 1/00849; B60H 1/3202; B60H 1/3233;
(Continued)

(56) References Cited

U.S. PATENT DOCUMENTS 2,162,809 A * 6/1939 Groak ...................... F24F 3/12
261/3
2,331,437 A * 10/1943 Sterick ..................... F28F 1/36
165/184
(Continued)

FOREIGN PATENT DOCUMENTS

KR 10-2006-0118391 11/2006
KR 10-1590575 B1 2/2016
(Continued)

*Primary Examiner* — Edelmira Bosques
*Assistant Examiner* — Allen R Schult
(74) *Attorney, Agent, or Firm* — Mintz Levin Cohn Ferris Glovsky and Popeo, P.C.; Peter F. Corless (57) ABSTRACT

A vehicle air-conditioning system includes a cold-air circulation section in which indoor air of a vehicle is cooled via heat exchange with a refrigerant and is again supplied to a passenger compartment, a hot-air circulation section in which the indoor air is raised in temperature via heat exchange and is then again supplied to the passenger compartment, a purification circulation section in which the indoor air is introduced and purified and is then again supplied to the passenger compartment, and a refrigerant circulation section in which the refrigerant circulates to undergo heat exchange with the cold-air circulation section and the hot-air circulation section. The vehicle air-conditioning system separates an indoor air flow-path from an outdoor air flow-path to block outdoor air when performing air conditioning, and performs air conditioning of the passenger compartment using only the indoor air without entry of the outdoor air.

23 Claims, 9 Drawing Sheets

(51) Int. Cl.
*B60H 3/00* (2006.01)
*B60H 1/32* (2006.01)
*B60H 3/02* (2006.01)

(52) U.S. Cl.
CPC ....... *B60H 1/00849* (2013.01); *B60H 1/3202* (2013.01); *B60H 1/32331* (2019.05); *B60H 3/0007* (2013.01); *B60H 3/0021* (2013.01); *B60H 3/022* (2013.01); *B60H 1/3233* (2013.01); *B60H 3/0085* (2013.01); *B60H 2003/0042* (2013.01); *B60H 2003/028* (2013.01)

(58) Field of Classification Search
CPC ................................. B60H 1/32331; B60H 3/0633; B60H 3/0007; B60H 3/0021; B60H 3/022; B60H 3/0085; B60H 2003/0042; B60H 2003/028
USPC ........................................ 454/154
See application file for complete search history.

(56) References Cited

U.S. PATENT DOCUMENTS

| | | | | |
|---|---|---|---|---|
| 5,900,330 | A | * | 5/1999 | Kagatani ................. B60L 8/003 |
| | | | | 429/422 |
| 5,910,773 | A | * | 6/1999 | Brownlee ............ B60H 3/0007 |
| | | | | 180/272 |
| 2004/0011068 | A1 | * | 1/2004 | Hatakeyama ...... B60H 1/00849 |
| | | | | 62/228.1 |
| 2008/0149475 | A1 | * | 6/2008 | Yamamoto ............ C02F 1/4672 |
| | | | | 204/196.01 |
| 2009/0020172 | A1 | * | 1/2009 | Walker .................... C02F 1/006 |
| | | | | 137/563 |
| 2013/0309956 | A1 | * | 11/2013 | Mouch ................... B60H 1/249 |
| | | | | 454/165 |
| 2016/0146489 | A1 | * | 5/2016 | Najafi .................. F24F 11/0001 |
| | | | | 236/49.3 |
| 2018/0216319 | A1 | * | 8/2018 | Dudar ....................... B60D 7/00 |
| 2018/0283307 | A1 | * | 10/2018 | Dudar ................ F02M 25/0225 |
| 2019/0077228 | A1 | * | 3/2019 | Goto ....................... B60N 2/565 |

FOREIGN PATENT DOCUMENTS

| | | |
|---|---|---|
| KR | 10-1649159 B1 | 8/2016 |
| KR | 10-2017-0035481 | 3/2017 |

* cited by examiner

AIR-CONDITIONING SYSTEM FOR VEHICLE

CROSS-REFERENCE TO RELATED APPLICATION

This application claims under 35 U.S.C. § 119(a) the benefit of Korean Patent Application No. 10-2017-0146760, filed on Nov. 6, 2017 in the Korean Intellectual Property Office, the entire contents of which are incorporated herein by reference.

BACKGROUND

1. Technical Field

The present disclosure relates to an air-conditioning system for vehicles, and more particularly, to a vehicle air-conditioning system, which is operable such that the inside and the outside of a vehicle are completely separated from each other in order to protect against air pollution.

2. Description of the Related Art

An air-conditioning system for a vehicle serves to perform heating/cooling or ventilation of a passenger compartment of the vehicle, and performs air conditioning by introducing a small amount of outdoor air together with indoor air, even if an indoor air mode is set upon air conditioning of the vehicle.

However, due to the increasing prevalence of air pollution, there is a possibility that the user's health may be deteriorated when contaminants such as fine dust, which are introduced from the outside of the vehicle in the indoor air mode, are not completely blocked.

Therefore, in order to prevent such indoor air pollution, indoor air is purified using a vehicle air purifier or the like, but the effect thereof is insufficient, and it is difficult to fundamentally protect against air pollution.

Details described as the background art are intended merely for the purpose of promoting the understanding of the background of the present disclosure and should not be construed as an acknowledgment of the prior art that is not known to those of ordinary skill in the art.

SUMMARY

The present disclosure provides a vehicle air-conditioning system, which operates such that the inside and the outside of a vehicle are completely separated from each other in order to protect against air pollution, thereby fundamentally preventing harmful substances from being introduced into a passenger compartment of the vehicle.

In accordance with an aspect of the present disclosure, the above and other objects can be accomplished by the provision of an air-conditioning system for a vehicle including a cold-air circulation section in which indoor air of a vehicle is cooled via heat exchange with a refrigerant and is then supplied to a passenger compartment, a hot-air circulation section in which the indoor air of the vehicle is raised in temperature via heat exchange and is then again supplied to the passenger compartment, a purification circulation section in which the indoor air of the vehicle is introduced and purified and is then again supplied to the passenger compartment, and a refrigerant circulation section in which the refrigerant circulates to undergo heat exchange with the cold-air circulation section and the hot-air circulation section, wherein the vehicle air-conditioning system separates an indoor air flow-path and an outdoor air flow-path for the vehicle from each other to block outdoor air when performing air conditioning, and performs air conditioning of the passenger compartment using only the indoor air without entry of outdoor air.

The cold-air circulation section may be configured so as to share an evaporator of the refrigerant circulation section, such that the indoor air is cooled via heat exchange with the evaporator and is then again supplied to the passenger compartment.

The hot-air circulation section may be configured so as to share an indoor air-conditioning condenser of the refrigerant circulation section, such that the indoor air is raised in temperature via heat exchange with the indoor air-conditioning condenser and is then again supplied to the passenger compartment.

The purification circulation section may include a carbon dioxide absorber, the carbon dioxide absorber may include a case and a carbon dioxide remover provided in the case, and the carbon oxide absorber may be provided so as to be replaceable.

The purification circulation section may include an air washer, and the air washer may include a housing, which stores purified water therein and is provided in one side thereof with an inlet port for introduction of the indoor air and is provided in a remaining side thereof with an outlet port for discharge of purified air that has passed through the purified water, and a pressure member, which applies pressure to an inside of the housing so as to cause the indoor air, which is introduced through the inlet port to pass through the purified water, to be discharged.

The housing may include an upstream side, at which the inlet port and the pressure member are provided, and a downstream side at which the outlet port is provided, the downstream side may be provided with a circulation flow-path, which causes the purified water to be circulated to the upstream side when the purified water reaches a predetermined water level, and the circulation flow-path may be provided with a circulation door, which opens or closes the circulation flow-path, and the circulation door is opened when the pressure member applies pressure to the purified water so that the purified water in the downstream side circulates to the upstream side through the circulation flow-path, whereby only the purified air is discharged to an outside of the housing.

The purification circulation section may include an oxygen generator, the oxygen generator may include a water tank, in which water is stored, and a decomposer, which performs electrolysis on the water inside the water tank, and oxygen may be generated via the electrolysis of water in the water tank by the decomposer so that the generated oxygen is supplied to the passenger compartment.

The oxygen generator may further include an oxygen compressor, and the oxygen compressor may maintain a pressure inside the oxygen generator at an air pressure at which electrolysis easily occurs while the decomposer performs electrolysis of water.

The purification circulation section may include a moisture supplier, and the moisture supplier may include a moisture collector, which collects moisture therein, and a moisture controller, which processes and supplies the moisture collected in the moisture collector.

The moisture collector may include a sterilizer configured to sterilize the collected moisture, and the sterilizer may be located close to a compressor of the refrigerant circulation section so that bacteria present in the moisture inside the moisture collector are killed by a high temperature of the compressor.

The sterilizer may include a sterilization tank through which a refrigerant flow-path downstream of the compressor penetrates, and the collected moisture may be stored and then sterilized in the sterilization tank.

The sterilizer may be a sterilization flow-path wound around an outer circumferential surface of the refrigerant flow-path downstream of the compressor, and the moisture collected in the moisture collector may pass through the sterilization flow-path so that bacteria in the moisture are killed.

A multi-way valve maybe provided downstream of the compressor in a refrigerant movement direction so as to be controlled by a controller, and the multi-way valve may be controlled by the controller so as to select at least one of the sterilizer and an indoor air-conditioning condenser so that the refrigerant is supplied thereto, whereby at least one operation among indoor heating or moisture sterilization is performed.

The moisture collector may be a condensate water tank in which condensate water generated in an evaporator of the refrigerant circulation section is stored, a refrigerant flow-path at a side of the evaporator may be provided with an air flow-path, through which air passes, and a drain hole may be formed below the air flow-path in a direction of gravity so that the condensate water is collected in the condensate water tank through the drain hole.

The air flow-path may be provided with a washing portion, which is in communication with an outside, and the washing portion may include an introduction port and a discharge port so that a fluid introduced through the introduction port is moved along the air flow-path to wash an inside of the air flow-path and is then discharged through the discharge port so as to kill a mold in the condensate water.

The moisture collector may be a rainwater sump, which is provided so as to be in communication with an outside of the vehicle, so that rainwater outside the vehicle is collected in the rainwater sump.

The purification circulation section may include a concentration-sensing member, which measures a concentration of specific gases contained in the indoor air, and an operation of the moisture supplier may be controlled based on a concentration of oxygen and/or a concentration of carbon dioxide in the passenger compartment, which is sensed by the concentration-sensing member.

A controller may determine a number of occupants inside the vehicle based on information on a reduction in an amount of oxygen or an increase in an amount of carbon dioxide in the passenger compartment, which is sensed by the concentration-sensing member, and may reflect the determined number of occupants in air conditioning of the passenger compartment.

The purification circulation section may include a concentration-sensing member, which measures a concentration of specific gases contained in the indoor air, and a controller may determine a quality of the indoor air based on information on a concentration of oxygen and/or a concentration of carbon dioxide in the passenger compartment, which is sensed by the concentration-sensing member, and a reference value that is input in advance to the controller, and may control the purification circulation section so that the quality of indoor air is maintained at a reference value or more.

A controller may determine a number of occupants in the vehicle based on information on whether or not occupants are present, transmitted from an occupant-sensing member provided in a seat, and may control a degree of operation of at least one of the cold-air circulation section, the hot-air circulation section, the purification circulation section, and the refrigerant circulation section based on the number of occupants.

The purification circulation section may include at least one of a carbon oxide absorber, an air washer, an oxygen generator, and a moisture supplier, and moisture collected in the moisture supplier may be provided to the air washer and/or the oxygen generator.

A vehicle body may be provided with a pressure-holding grill, which is configured so as to be opened or closed, and a vehicle door may be opened or closed as the pressure-holding grill offsets a difference in pressure between an outside and an inside of the vehicle.

The cold-air circulation section and the refrigerant circulation section may further include a controller configured to control the cold-air circulation section and the refrigerant circulation section, and in a cooling mode, the controller may perform control to cause the indoor air to be cooled via heat exchange with the refrigerant, which is cooled via an evaporator of the refrigerant circulation section so that the cooled indoor air is again supplied to the passenger compartment.

The hot-air circulation section and the refrigerant circulation section may further include a controller configured to control the hot-air circulation section and the refrigerant circulation section, and in a heating mode, the controller may perform control to cause the indoor air to be raised in temperature via heat exchange with the refrigerant, which is raised in temperature via an indoor air-conditioning condenser and a compressor of the refrigerant circulation section so that the air having the raised temperature is again supplied to the passenger compartment.

The purification circulation section and the refrigerant circulation section may further include a controller configured to control the purification circulation section and the refrigerant circulation section, and in a purification mode, the controller may perform control to cause the indoor air, which is processed and then purified by a compressor of the refrigerant circulation section, to be again supplied to the passenger compartment.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a vehicle air-conditioning system according to various exemplary embodiments of the present disclosure will be described in detail with reference to the accompanying drawings.

Figure 1:
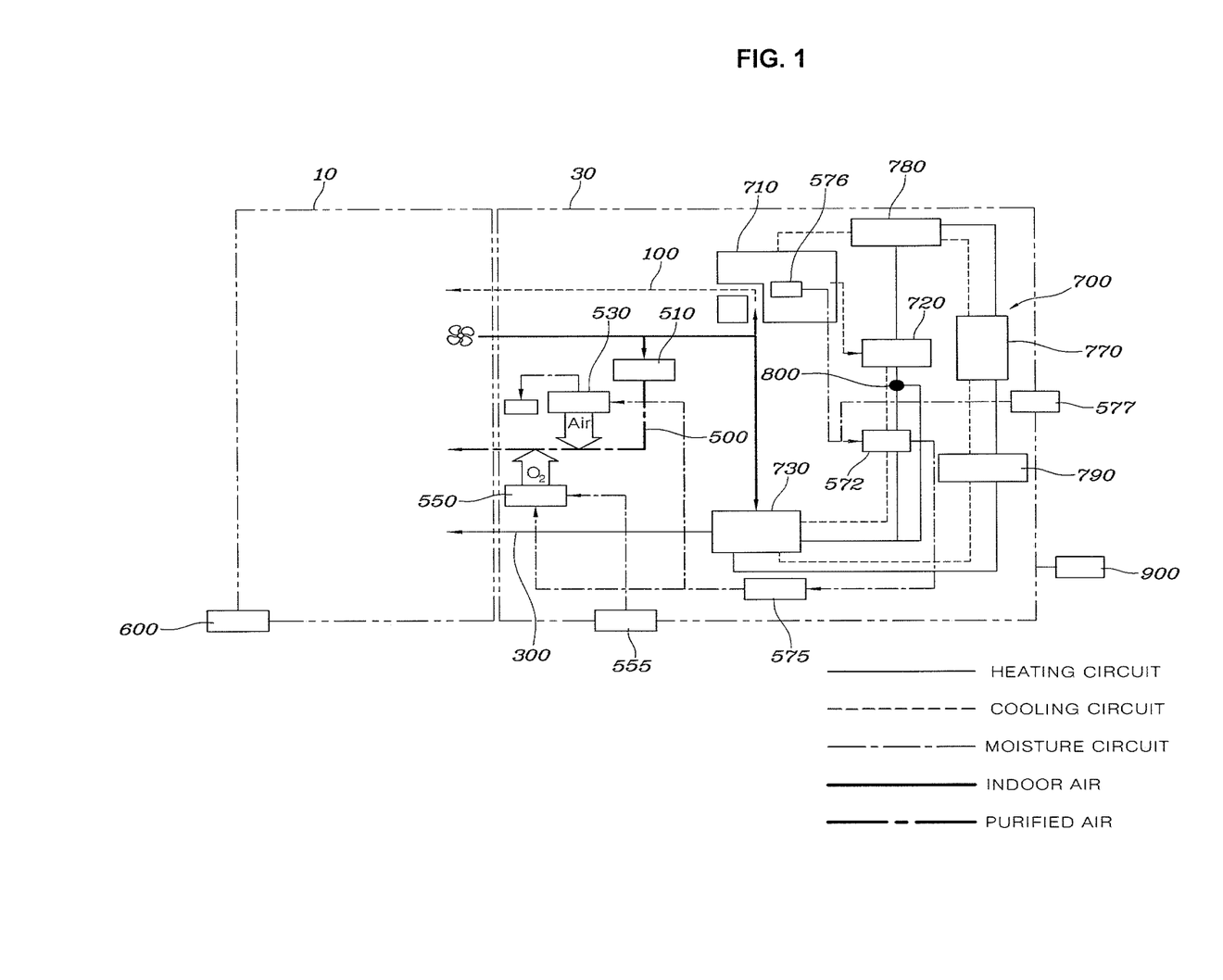
FIG. 1 is a view illustrating a vehicle air-conditioning system according to an embodiment of the present disclosure.
Figure 2:
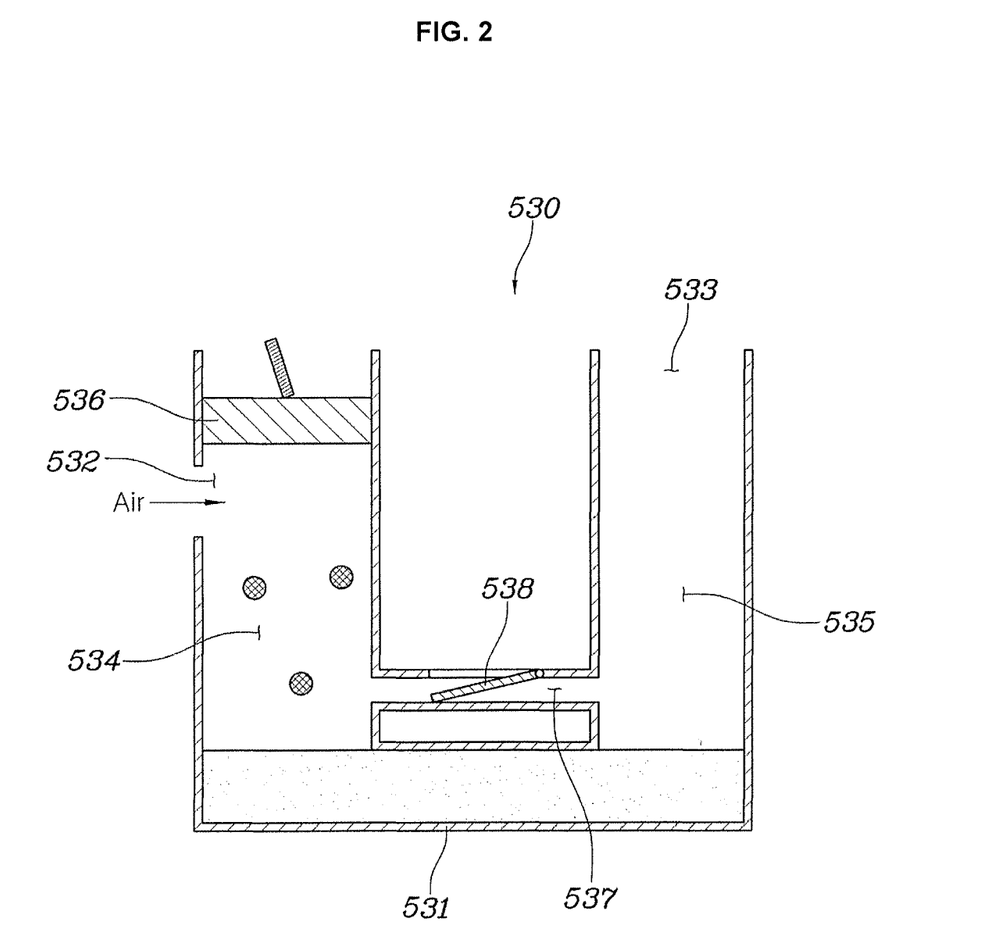
FIGS. 2 and 3 are views illustrating an air washer.
Figure 3:
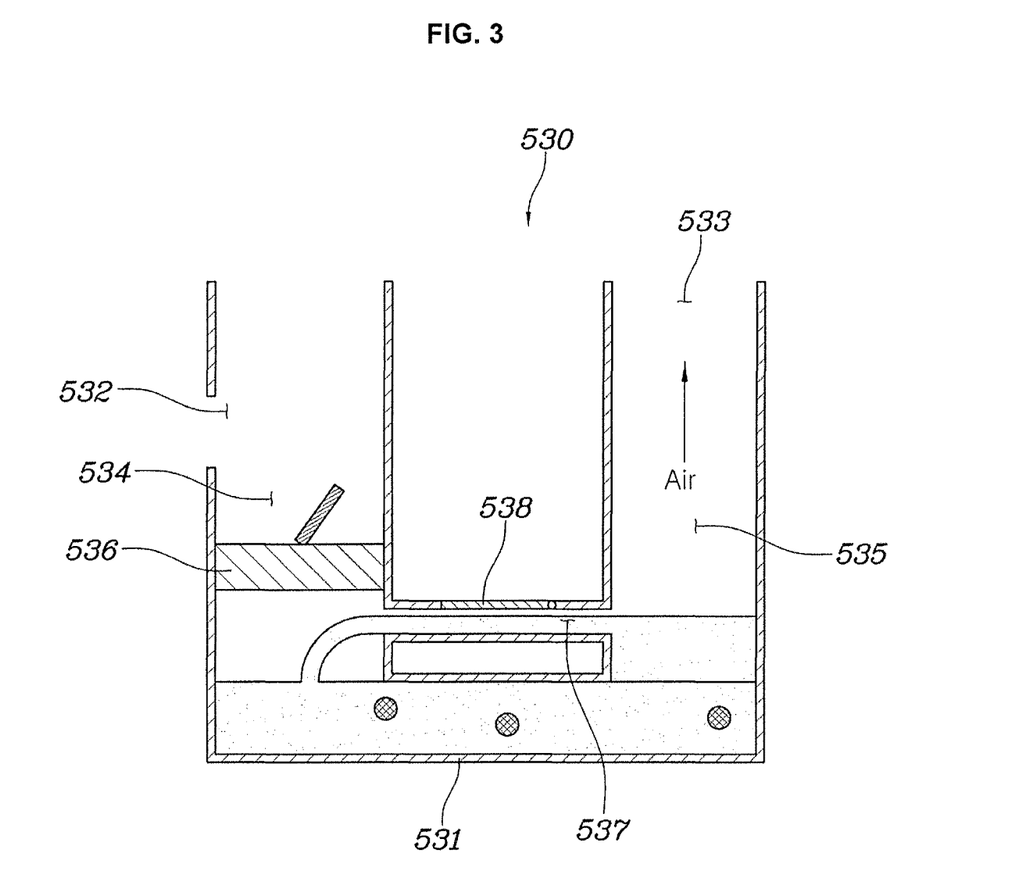
Figure 4:
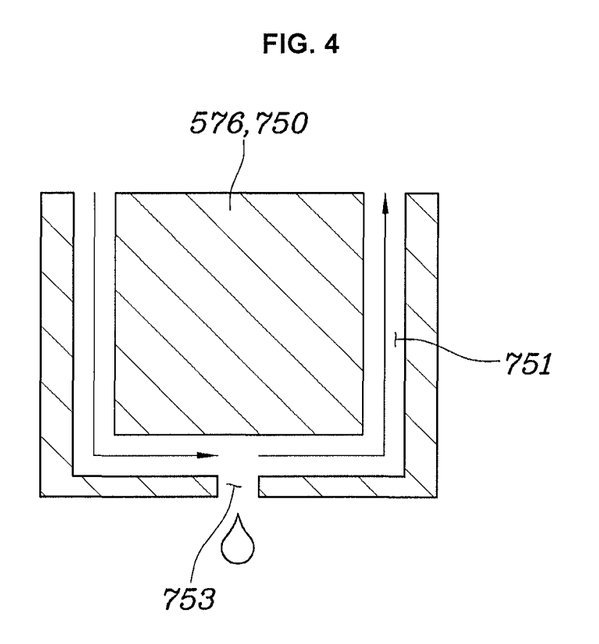
FIGS. 4 to 6 are views illustrating a moisture collector.
Figure 5:
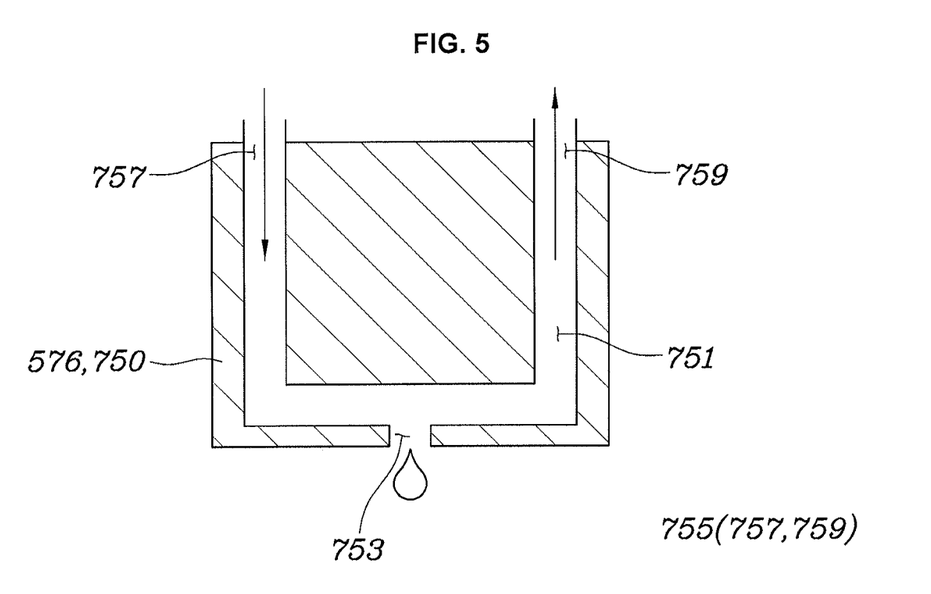
Figure 6:
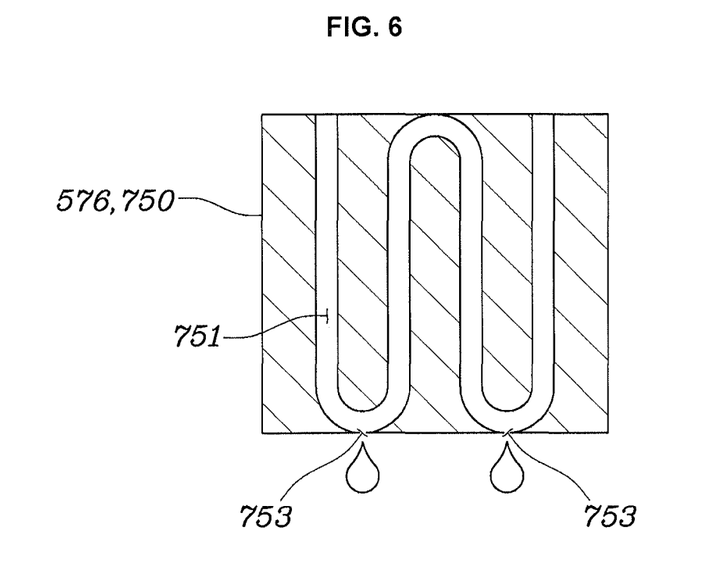
Figure 7:
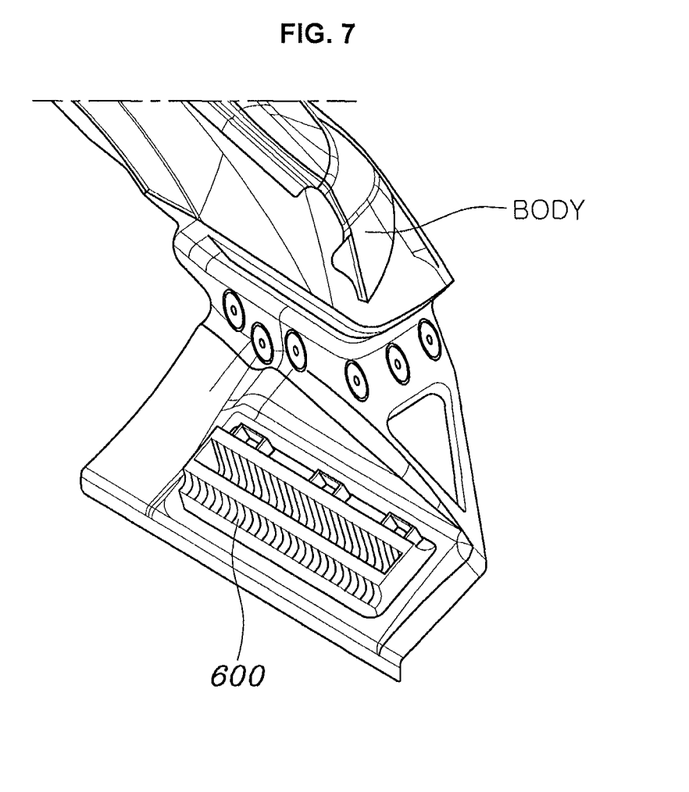
FIG. 7 is a view illustrating a pressure-holding grill.
Figure 8:
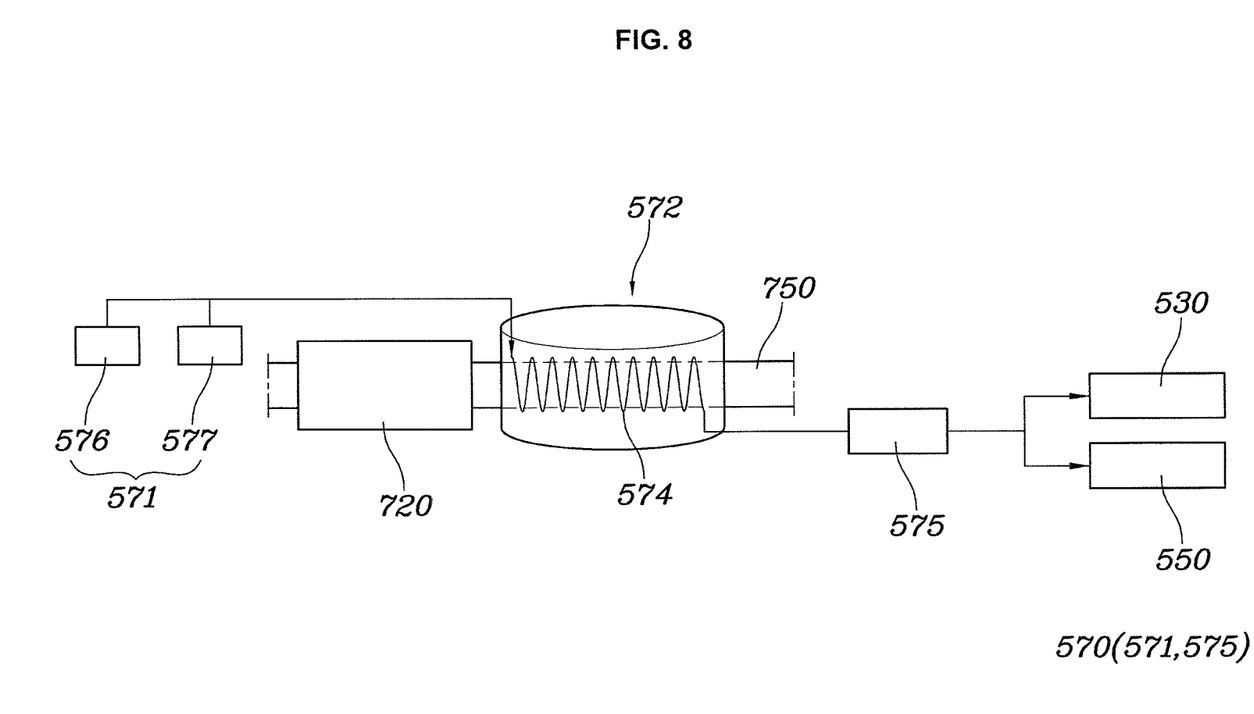
FIGS. 8 and 9 are views illustrating a sterilizer.
Figure 9:
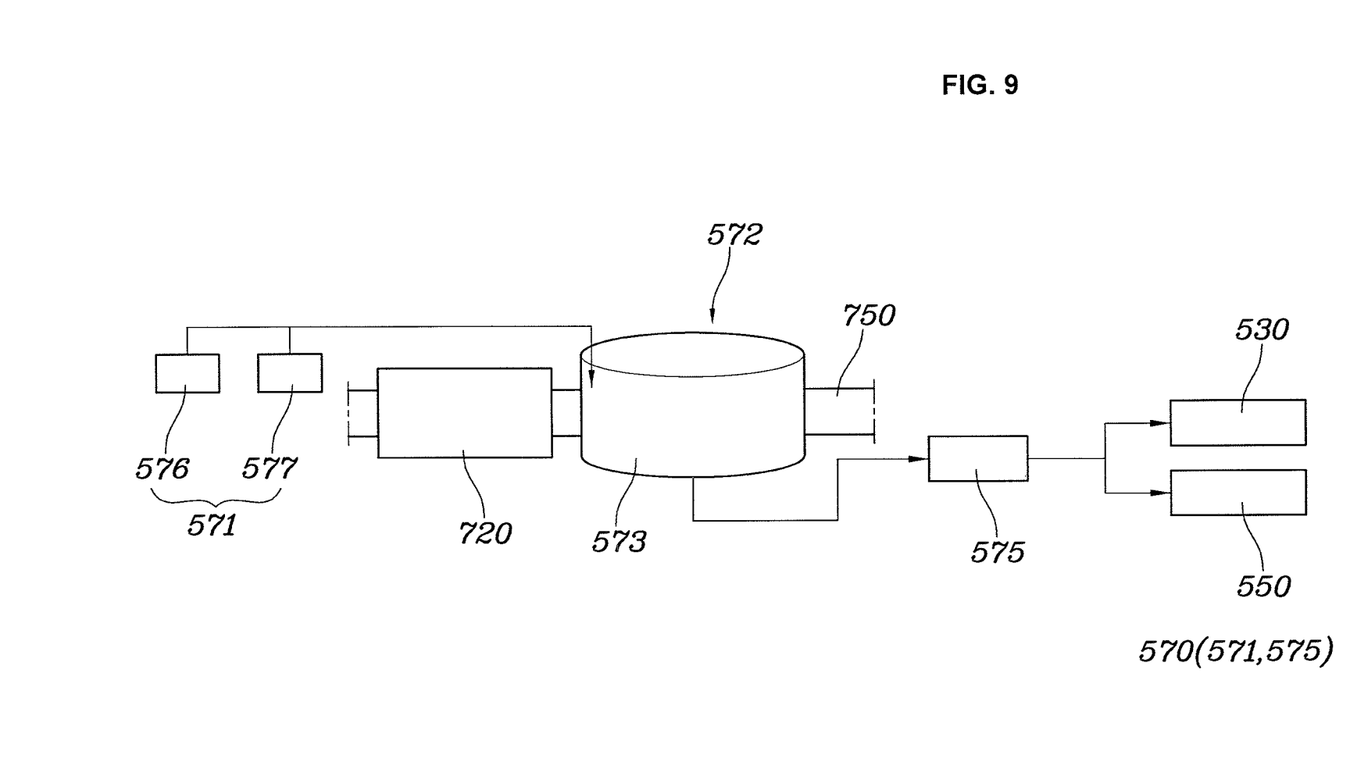

FIG. 1 is a view illustrating a vehicle air-conditioning system according to an embodiment of the present disclosure, FIGS. 2 and 3 are views illustrating an air washer 530, and FIGS. 4 to 6 are views illustrating a moisture collector 571. In addition, FIG. 7 is a view illustrating a pressure-holding grill 600, and FIGS. 8 and 9 are views illustrating a sterilizer 572.

A vehicle air-conditioning system according to an exemplary embodiment of the present disclosure includes a cold-air circulation section 100 in which indoor air of a vehicle is cooled via heat exchange with refrigerant and is then supplied to a passenger compartment 10, a hot-air circulation section 300 in which the indoor air of the vehicle is raised in temperature via heat exchange and is then again supplied to the passenger compartment 10, a purification circulation section 500 in which the indoor air of the vehicle is introduced and purified and is then again supplied to the passenger compartment 10, and a refrigerant circulation section 700 in which the refrigerant circulates so as to undergo heat exchange with the cold-air circulation section 100 and the hot-air circulation section 300. The air-conditioning system blocks outdoor air when performing air conditioning because an outdoor air flow-path and an indoor air flow-path are separated from each other, thus performing the air conditioning of the passenger compartment 10 using only indoor air, without the entry of outdoor air. That is, in the present disclosure, the vehicle air-conditioning system is configured such that the air flow-paths for the air conditioning of the passenger compartment are constituted independently for outdoor use and indoor use, and is capable of providing pleasant air to a user by recirculating and using 100% of indoor air, without using outdoor air during air conditioning, so as to prevent the interior of the passenger compartment 10 from being subjected to environmental pollution such as fine dust or toxic particles.

The vehicle air-conditioning system of the present disclosure may be applied to all types of vehicles, including to an autonomous vehicle that may be driven without manual operation on the part of the user. The vehicle air-conditioning system of the present disclosure performs air conditioning via repeated circulation of indoor air through constituent elements inside the passenger compartment 10 and an engine room 30, but prevents problems that may occur due to the repeated use of indoor air, such as accumulation of excessive carbon dioxide, oxygen deficiency, and air pollution, thereby improving the quality of air inside the vehicle owing to the exclusion of outdoor air, simplifying fundamental heating and cooling, and increasing fuel efficiency.

The vehicle air-conditioning system of the present disclosure is configured to cool, heat, or purify indoor air inside the passenger compartment 10 via the refrigerant circulation section 700 and then again supply the indoor air into the passenger compartment 10. As illustrated in FIG. 1, the vehicle air-conditioning system is constituted by the cold-air circulation section 100, the hot-air circulation section 300, the purification circulation section 500, and the refrigerant circulation section 700. The cold-air circulation section 100 is configured so as to share an evaporator 710 of the refrigerant circulation section 700, such that the indoor air is cooled via heat exchange with the evaporator 710 and is then again supplied to the passenger compartment 10. In the same manner, the hot-air circulation section 300 is configured so as to share an indoor air-conditioning condenser 730 of the refrigerant circulation section 700, such that the indoor air is raised in temperature via heat exchange with the indoor air-conditioning condenser 730 and is then again supplied to the passenger compartment 10. In addition, the purification circulation section 500 includes at least one of a carbon-dioxide absorber 510, an air washer 530, an oxygen generator 550, and a moisture supplier 570. When moisture collected in the moisture supplier 570 is supplied to the air washer 530 and/or the oxygen generator 550, problems such as the accumulation of excessive carbon dioxide, oxygen deficiency, and air pollution may be avoided despite the circulation of indoor air. The detailed configuration of the purification circulation section 500 will be described later. Finally, the refrigerant circulation section 700 is a closed loop in which the refrigerant circulates through a refrigerant flow-path 750, and the refrigerant circulates by passing through an outdoor condenser 770, a first expansion valve 780, a compressor 720, the evaporator 710, the indoor air-conditioning condenser 730, and a second expansion valve 790. In particular, the first expansion valve 780 and the second expansion valve 790 are configured so as to selectively perform a function as an expansion valve and a function as a refrigerant valve depending on whether a cooling mode or a heating mode is active.

The purification circulation section 500 will be described below in more detail.

The purification circulation section 500 includes the carbon-dioxide absorber 510. In the passenger compartment 10 of the vehicle, as the user breathes, the oxygen in the air decreases and the relative proportion of carbon dioxide increases. Thus, since drowsiness may be induced and breathing difficulty may occur due to the oxygen insufficiency, the indoor air is directed to pass through the carbon-dioxide absorber 510 so that carbon dioxide contained in the indoor air is removed. The carbon-dioxide absorber 510 may include a case (not illustrated) and a carbon dioxide remover (not illustrated) provided in the case (not illustrated). The carbon dioxide remover (not illustrated) may use a typically used chemical agent such as soda lime or soda sorb. In particular, in the present disclosure, the carbon dioxide absorber 510 is provided in the engine room 30. The carbon dioxide absorber 510 may be replaced when the carbon dioxide saturation of the carbon dioxide remover is increased after the carbon dioxide remover has been used for longer than a predetermined period of time and the carbon dioxide remover no longer absorbs carbon dioxide effectively. The equation for the chemical reaction occurring in the carbon dioxide absorber 510 is represented as follows.

$$Ca(OH)_2 + CO_2 \rightarrow CaCo_3 \downarrow + H_2O$$

(here, $Ca(OH)_2$ is soda lime.)

At this time, the moisture generated in the carbon dioxide absorber 510 may be supplied to and reused in the moisture supplier 570 of the purification circulation section 500.

FIGS. 2 and 3 are views illustrating the air washer 530, and the purification circulation section 500 includes the air washer 530. When the user who is in the passenger compartment 10 of the vehicle opens or closes a vehicle door or a vehicle window, contaminants such as fine dust, various floating matter, or volatile organic compounds (VOCs) outside the vehicle may be introduced into the passenger compartment 10, and the air inside the passenger compartment 10 may be contaminated. Thus, since it is possible to harm the user when continuously circulating the contaminated indoor air, the indoor air is directed to pass through the air washer 530 so that contaminants included in the indoor air are removed. The air washer 530 includes a housing 531 in which purified water is stored, and a pressure member 536, which applies pressure to the inside of the housing 531. The housing 531 is provided in one side thereof with an inlet port 532, into which indoor air is introduced, and is provided in the other side thereof with an outlet port 533, from which the purified air that has passed through the purified water is discharged. In particular, the housing 531 may be constituted by an upstream side 534, at which the inlet port 532 and the pressure member 536 are provided, and a downstream side 535, at which the outlet port 533 is provided. The downstream side 535 is provided with a circulation flow-path 537, which causes the purified water to be circulated to the upstream side 534 when the purified water reaches a predetermined water level, and the circulation flow-path 537 is provided with a circulation door 538, which opens or closes the circulation flow-path 537. When the pressure member 536 applies pressure to the purified water, the circulation door 538 is opened so that the purified water in the downstream side 535 circulates to the upstream side 534 through the circulation flow-path 537. The pressure member 536 may be a piston. Thus, when the pressure member 536 applies pressure to the inside of the housing 531 via piston movement, the indoor air introduced through the inlet port 532 passes through the purified water inside the housing 531 so that contaminants are collected in the purified water, and only the purified air that has passed through the purified water is discharged through the outlet port 533. When the circulation door 538 is opened by the pressure applied by the pressure member 536 so that the purified water in the downstream side 535 of the housing 531 is moved to the upstream side 534 through the circulation flow-path 537, only the purified air, other than the purified water, may be discharged to the outside of the housing 531.

The purification circulation section 500 includes the oxygen generator 550. In the passenger compartment 10 of the vehicle, since the amount of oxygen in the air may decrease as the user breathes, causing breathing difficulty, it is necessary to supply additional oxygen to the passenger compartment 10. Therefore, oxygen is generated via the oxygen generator 550, which is separately configured, and is supplied to the passenger compartment 10. The oxygen generator 550 includes a water tank (not illustrated), in which water is stored, and a decomposer (not illustrated), which performs electrolysis (hydrolysis) on the water inside the water tank (not illustrated). Thus, as oxygen is generated via the electrolysis of water in the water tank (not illustrated) by the decomposer (not illustrated), the generated oxygen is supplied to the passenger compartment 10. The oxygen generator 550 further includes an oxygen compressor 555, and the oxygen compressor 555 maintains the inside of the oxygen generator 550 at an air pressure at which electrolysis easily occurs when the decomposer (not illustrated) performs the electrolysis of water, thereby contributing to the efficient implementation of electrolysis. The equation for the chemical reaction occurring in the oxygen generator 550 is represented as follows.

$$2H_2O(l) \rightarrow O_2(g) + 4e^- + 4H^+$$

Thus, oxygen generated via the oxygen generator 550 is supplied to the passenger compartment 10 so as to prevent user breathing difficulty.

In addition, FIGS. 4 to 6 are views illustrating the moisture collector 571, and the purification circulation unit 500 further includes the moisture supplier 570. The air washer 530 and the oxygen generator 550 require moisture in order to perform the corresponding operation. At this time, although the moisture generated in the carbon dioxide absorber 510 may be used, the moisture supplier 570 is provided in order to efficiently and appropriately supply a greater amount of moisture. The moisture supplier 570 includes the moisture collector 571, which collects moisture therein, and a moisture controller 575, which processes and supplies the moisture collected in the moisture collector 571. The moisture controller 575 serves to appropriately process the moisture collected in the moisture collector 571 and efficiently supply the moisture to the air washer 530 and the oxygen generator 550.

In addition, the moisture collector 571 may be a condensate water tank 576 in which condensate water generated in the evaporator 570 of the refrigerant circulation section 700 is stored. Thus, the refrigerant flow-path 750 at the side of the evaporator 710 is provided with an air flow-path 751, through which air passes, and a drain hole 753 is formed below the air flow-path 751 in the direction of gravity so that the condensate water is collected in the condensate water tank 576 through the drain hole 753. At this time, the moisture collector 571 may be formed in the refrigerant flow-path 750, and may be a refrigerant reservoir in which the refrigerant cooled by the evaporator 710 is stored. The moisture collector 571 is illustrated as being a refrigerant reservoir in this specification, but may have any other shape so long as it is formed at the side of the evaporator 710. In particular, the air flow-path 751 of the moisture collector 571 is provided with a washing portion 755, which may be in communication with the outside of the air flow-path 751.

The washing portion 755 includes an introduction port 757 and a discharge port 759, and a fluid (including detergent, water, or the like) introduced through the introduction port 757 moves along the air flow-path 751 to wash the inside of the air flow-path 751 and is then discharged through the discharge port 759. The reason why the washing portion 755 is provided is that the moisture collector 571 uses the condensate water condensed in the evaporator 710, and thus microorganisms such as mold may be contained in the condensate water. Therefore, when the air flow-path 751 is washed via the washing portion 755, foreign substances such as mold contained in the condensate water may be removed, which may allow cleaner air to be supplied to the user. In addition, the moisture collector 571 may be a rainwater sump 577, which is provided so as to be in communication with the outside of the vehicle. Thus, rainwater outside the vehicle may be collected in the rainwater sump 577 and processed by the refrigerant circulation section 700, and then may be provided to the air washer 530 or the oxygen generator 550. The moisture collector 571 is illustrated and described as including both the condensate water tank 576 and the rainwater sump 577, but may be configured to include only one of the two.

In addition, the purification circulation section 500 includes a concentration-sensing member (not illustrated), which measures the concentration of specific gases contained in the indoor air. Although the indoor air contains various kinds of gases, among these, the concentration-sensing member senses the concentration of oxygen and carbon dioxide, which particularly affect the user. Thus, the operation of the moisture supplier 570 is controlled based on information on the concentration of oxygen and/or the concentration of carbon dioxide in the passenger compartment, which is sensed by the concentration-sensing member. When the concentration of oxygen in the passenger compartment sensed by the concentration-sensing member is higher than a reference concentration, control is performed to stop the supply of moisture. When the sensed concentration of oxygen is lower than the reference concentration, control is performed to begin the supply of moisture or to increase the amount of moisture that is supplied.

A controller 900 determines the number of occupants inside the vehicle based on information on a reduction in the amount of oxygen, an increase in the amount of carbon dioxide, or the like in the passenger compartment, which is sensed by the concentration-sensing member, and reflects the result of the determination in the air conditioning of the passenger compartment. That is, since the required concentration of oxygen differs depending on the number of occupants in the passenger compartment, the concentration of oxygen and carbon dioxide contained the indoor air may be appropriately adjusted based on data such as a required concentration of oxygen, a tolerable amount of carbon dioxide, or the like depending on the number of occupants, which is input in advance to the controller 900.

That is, the purification circulation unit 500 includes the concentration-sensing member, which measures the concentration of specific gases contained in the indoor air, and the controller 900 determines the quality of indoor air based on information on the concentration of oxygen and/or the concentration of carbon dioxide in the passenger compartment, sensed by the concentration-sensing member, and a reference value that is input in advance to the controller 900, and controls the purification circulation section 500 so that the quality of indoor air is maintained at a reference value or more, whereby pleasant air may be supplied to the user to increase user satisfaction.

In particular, a vehicle seat (not illustrated) is typically provided with a sensor such as a seat belt resistor (SBR) sensor, which checks whether or not an occupant wears a seat belt, so that the controller 900 may determine the number of occupants by recognizing the presence or absence of occupants. Thus, the controller 900 may determine the number of occupants in the vehicle based on information on whether or not occupants are present using an occupant-sensing member (not illustrated) such as an SBR sensor or a seating sensor, and may control the degree of operation of at least one of the cold-air circulation section 100, the hot-air circulation section 300, the purification circulation section 500, and the refrigerant circulation section 700 based on the number of occupants and a reference value that is input in advance into the controller 900, whereby a more pleasant indoor environment may be provided to the user.

FIGS. 8 and 9 are views illustrating a sterilizer 572. The moisture collector 571 further includes the sterilizer 572, which sterilizes the collected moisture. As described above, since the moisture collector 571 collects the condensate water from the evaporator 710 or outside rainwater, foreign substances, microorganisms, or the like may be contained in the moisture. Thus, when the moisture is sterilized via the sterilizer 572, cleaner moisture may be provided and cleaner air may be supplied to the passenger compartment 10. The sterilizer 572 may be located close to the compressor 720 of the refrigerant circulation section 700. This is because the temperature of the compressor 720 is close to about 100-120° C., and moisture may be boiled and sterilized. Thus, bacteria, such as microorganisms present in the moisture inside the moisture collector 571, are killed by the high temperature of the compressor 720. As illustrated in FIG. 8, the sterilizer 572 may be a sterilization flow-path 574, which is wound around the outer circumferential surface of the refrigerant flow-path 750 downstream of the compressor 720. Hence, as the moisture collected in the moisture collector 571 passes through the sterilization flow-path 574, bacteria inside the moisture are killed by the high temperature of the compressor 720. In addition, as illustrated in FIG. 9, the sterilizer 572 may be a sterilization tank 573, through which the refrigerant flow-path 750 downstream of the compressor 720 penetrates. In the same manner, after the collected moisture is stored in the sterilization tank 573, microorganisms or the like in the moisture are sterilized by the high temperature of the compressor 720.

In addition, FIG. 7 is a view illustrating a pressure-holding grill 600, and the pressure-holding grill 600 is provided on a vehicle body so as to be opened or closed. When the passenger compartment 10 is isolated and sealed from the outside in order to allow only the indoor air to circulate in the passenger compartment 10, there is a difference in pressure between the passenger compartment 10 and the outside. This may make it difficult for a vehicle door (not illustrated), which is used for the entry and exit of occupants, user's getting on and off, to be opened or closed. Thus, when the pressure-holding grill 600 is provided on the vehicle body, it is possible to remove the difference in pressure between the passenger compartment 10 and the outside. In particular, the pressure-holding grill 600 may be variably provided so as to enable precise opening/closing adjustment. In addition, since the atmospheric pressure in the passenger compartment 10 of the vehicle may be maintained at a predetermined level or less by the pressure-holding grill 600, the atmospheric pressure in the passenger compartment 10 may be controlled so as to be optimized to prevent the user in the passenger compartment 10 from succumbing to oxygen poisoning. At this time, the predetermined level may be 0.21 atm.

The refrigerant circulation section 700 includes a multi-way valve 800, which is provided downstream of the compressor 720 in a refrigerant movement direction and is controlled by the controller 900. The multi-way valve 800 may be controlled by the controller 900 so as to select at least one of the sterilizer 572 and the indoor air-conditioning condenser 730 to enable the supply of refrigerant thereto, thereby allowing at least one operation of indoor heating and moisture sterilization to be performed. Thus, in a heating mode, heated refrigerant may be supplied to both the sterilizer 572 and the indoor air-conditioning condenser 730 so that sterilization of the moisture in the moisture supplier 570 and indoor heating may be performed at the same time.

The controller 900 is provided in the cold-air circulation section 100, the hot-air circulation section 300, the purification circulation section 500, and the refrigerant circulation section 700 to control the cold-air circulation section 100, the hot-air circulation section 300, the purification circulation section 500, and the refrigerant circulation section 700. Thus, in a cooling mode, the controller 900 performs control to cause the indoor air to be cooled via heat exchange with the refrigerant, which is cooled via the evaporator 710 of the refrigerant circulation section 700 so that the cooled indoor air is again supplied to the passenger compartment 10. In addition, in a heating mode, the controller 900 performs control to cause the indoor air to be raised in temperature via heat exchange with the refrigerant, which is raised in temperature via the indoor air-conditioning condenser 730 and the compressor 720 of the refrigerant circulation section 700 so that the air having the raised temperature is again supplied to the passenger compartment 10. Finally, in a purification mode, the controller 900 performs control to cause the indoor air, which is processed and then purified by the compressor 720 of the refrigerant circulation section 700, to be again supplied to the passenger compartment 10.

As is apparent from the above description, according to a vehicle air-conditioning system having the above-described structure, air conditioning is performed using repeated circulation of indoor air through constituent elements inside a passenger compartment and an engine room, and problems that may occur due to the repeated use of indoor air, such as excessive carbon dioxide, oxygen deficiency, and air pollution, may be solved, and thus it is not necessary to introduce air from the outside. Thereby, the quality of air inside a vehicle may be improved, control and configuration for basic heating and cooling may be simplified, and fuel efficiency may be increased.

Although the preferred embodiments of the present disclosure have been described above with reference to the accompanying drawings, those skilled in the art will appreciate that the present disclosure can be implemented in various other embodiments without changing the technical ideas or features thereof.

What is claimed is:
1. A vehicle air-conditioning system, comprising:
 a cold-air circulation circuit in which indoor air of a vehicle is cooled via heat exchange with a refrigerant and is then supplied to a passenger compartment;
 a hot-air circulation circuit in which the indoor air of the vehicle is raised in temperature via heat exchange and is then supplied back to the passenger compartment;
 a purification circulation circuit in which the indoor air of the vehicle is introduced and purified and is then supplied back to the passenger compartment; and
 a refrigerant circulation circuit in which the refrigerant circulates to undergo heat exchange with the cold-air circulation circuit and the hot-air circulation circuit,
 wherein the vehicle air-conditioning system separates an indoor air flow-path and an outdoor air flow-path for the vehicle from each other to block outdoor air when performing air conditioning, and performs air conditioning of the passenger compartment using only the indoor air without entry of the outdoor air, and
 wherein:
 the purification circulation circuit comprises an air washer;
 the air washer comprises a housing, which stores purified water therein and is provided in one side thereof with an inlet port for introduction of the indoor air and is provided in a remaining side thereof with an outlet port for discharge of purified air that has passed through the purified water, and a pressure element, which applies pressure to an inside of the housing so as to cause the indoor air, which is introduced through the inlet port to pass through the purified water, to be discharged;
 the housing comprises an upstream side, at which the inlet port and the pressure element are provided, and a downstream side at which the outlet port is provided;
 the downstream side is provided with a circulation flow-path, which causes the purified water to be circulated to the upstream side when the purified water reaches a predetermined water level; and
 the circulation flow-path is provided with a circulation door, which opens or closes the circulation flow-path, and the circulation door is opened when the pressure element applies pressure to the purified water so that the purified water in the downstream side circulates to the upstream side through the circulation flow-path, whereby only the purified air is discharged to an outside of the housing.

2. The system according to claim 1, wherein the cold-air circulation circuit is configured so as to share an evaporator of the refrigerant circulation circuit, such that the indoor air is cooled via heat exchange with the evaporator and is then supplied back to the passenger compartment.

3. The system according to claim 1, wherein the hot-air circulation circuit is configured so as to share an indoor air-conditioning condenser of the refrigerant circulation circuit, such that the indoor air is raised in temperature via heat exchange with the indoor air-conditioning condenser and is then supplied back to the passenger compartment.

4. The system according to claim 1, wherein:
 the purification circulation circuit comprises a carbon dioxide absorber;
 the carbon dioxide absorber comprises a case and a carbon dioxide remover provided in the case; and
 the carbon oxide absorber is provided so as to be replaceable.

5. The system according to claim 1, wherein:
 the purification circulation circuit comprises an oxygen generator;
 the oxygen generator comprises a water tank, in which water is stored, and a decomposer, which performs electrolysis on the water inside the water tank; and
 oxygen is generated via the electrolysis of water in the water tank by the decomposer so that the generated oxygen is supplied to the passenger compartment.

6. The system according to claim 5, wherein:
 the oxygen generator further comprises an oxygen compressor for compressing a system in which oxygen is generated; and the oxygen compressor maintains a pressure inside the oxygen generator at an air pressure at which electrolysis occurs while the decomposer performs electrolysis of water.

7. The system according to claim 1, wherein:
the purification circulation circuit comprises a moisture supplier; and
the moisture supplier comprises a moisture collector, which collects moisture therein, and a moisture controller, which processes and supplies the moisture collected in the moisture collector.

8. The system according to claim 7, wherein:
the moisture collector comprises a sterilizer configured to sterilize the collected moisture; and
the sterilizer is connected to a compressor of the refrigerant circulation circuit by a refrigerant flow-path so that bacteria present in the moisture inside the moisture collector are killed by a temperature of the compressor.

9. The system according to claim 8, wherein:
the sterilizer comprises a sterilization tank through which the refrigerant flow-path downstream of the compressor penetrates; and
the collected moisture is stored and then sterilized in the sterilization tank.

10. The system according to claim 8, wherein:
the sterilizer is a sterilization flow-path wound around an outer circumferential surface of the refrigerant flow-path downstream of the compressor; and
the moisture collected in the moisture collector passes through the sterilization flow-path so that bacteria in the moisture are killed.

11. The system according to claim 8, wherein:
a multi-way valve is provided downstream of the compressor in a refrigerant movement direction so as to be controlled by a controller; and
the multi-way valve is controlled by the controller so as to select at least one of the sterilizer and an indoor air-conditioning condenser so that the refrigerant is supplied thereto, whereby at least one operation among indoor heating or moisture sterilization is performed.

12. The system according to claim 7, wherein:
the moisture collector is a condensate water tank in which condensate water generated in an evaporator of the refrigerant circulation circuit is stored;
a refrigerant flow-path at a side of the evaporator is provided with an air flow-path, through which air passes; and
a drain hole is formed below the air flow-path in a direction of gravity so that the condensate water is collected in the condensate water tank through the drain hole.

13. The system according to claim 12, wherein:
the air flow-path is provided with a washing portion, which is in communication with an outside; and
the washing portion comprises an introduction port and a discharge port so that a fluid introduced through the introduction port is moved along the air flow-path to wash an inside of the air flow-path and is then discharged through the discharge port so as to kill a mold in the condensate water.

14. The system according to claim 7, wherein the moisture collector is a rainwater sump, which is provided so as to be in communication with an outside of the vehicle, so that rainwater outside the vehicle is collected in the rainwater sump.

15. The system according to claim 7, wherein:
the purification circulation circuit comprises a concentration-sensing sensor configured to measure a concentration of oxygen or carbon dioxide contained in the indoor air; and
an operation of the moisture supplier is controlled based on the concentration of oxygen or the concentration of carbon dioxide in the passenger compartment, which is sensed by the concentration-sensing sensor.

16. The system according to claim 15, wherein a controller determines a number of occupants inside the vehicle based on information on a reduction in an amount of oxygen or an increase in an amount of carbon dioxide in the passenger compartment, which is sensed by the concentration-sensing sensor such that based on the determined number of occupants, air conditioning of the passenger compartment is performed.

17. The system according to claim 1, wherein:
the purification circulation circuit comprises a concentration-sensing sensor configured to measure a concentration of oxygen or carbon dioxide contained in the indoor air; and
a controller determines a quality of the indoor air based on information on the concentration of oxygen or the concentration of carbon dioxide in the passenger compartment, which is sensed by the concentration-sensing sensor, and a reference value that is input in advance to the controller, and controls the purification circulation circuit so that the quality of indoor air is maintained at a reference value or more of the concentration of oxygen or the concentration of carbon dioxide.

18. The system according to claim 1, wherein a controller determines a number of occupants in the vehicle based on information on whether or not occupants are present, transmitted from an occupant-sensing member provided in a seat, and controls a degree of operation of at least one of the cold-air circulation circuit, the hot-air circulation circuit, the purification circulation circuit, and the refrigerant circulation circuit based on the number of occupants.

19. The system according to claim 1, wherein the purification circulation circuit comprises at least one of a carbon oxide absorber, an air washer, an oxygen generator, and a moisture supplier, such that moisture collected in the moisture supplier is provided to the air washer and the oxygen generator.

20. The system according to claim 1, wherein a vehicle body is provided with a pressure-holding grill, which is configured so as to be opened or closed, and a vehicle door is opened or closed as the pressure-holding grill offsets a difference in pressure between an outside and an inside of the vehicle.

21. The system according to claim 1, wherein:
the cold-air circulation circuit and the refrigerant circulation circuit further comprise a controller configured to control the cold-air circulation circuit and the refrigerant circulation circuit; and
in a cooling mode, the controller performs control to cause the indoor air to be cooled via heat exchange with the refrigerant, which is cooled via an evaporator of the refrigerant circulation circuit so that the cooled indoor air is supplied back to the passenger compartment.

22. The system according to claim 1, wherein:
the hot-air circulation circuit and the refrigerant circulation circuit further comprise a controller configured to control the hot-air circulation circuit and the refrigerant circulation circuit; and
in a heating mode, the controller performs control to cause the indoor air to be raised in temperature via heat exchange with the refrigerant, which is raised in temperature via an indoor air-conditioning condenser and a compressor of the refrigerant circulation circuit so that the air having the raised temperature is supplied back to the passenger compartment.

23. The system according to claim 1, wherein:
the purification circulation circuit and the refrigerant circulation circuit further comprise a controller configured to control the purification circulation circuit and the refrigerant circulation circuit; and
in a purification mode, the controller performs control to cause the indoor air, which is processed and then purified, to be supplied back to the passenger compartment by a compressor of the refrigerant circulation circuit.

* * * * *